United States Patent [19]

Morishita et al.

[11] Patent Number: 4,778,021

[45] Date of Patent: Oct. 18, 1988

[54] MOTOR-DRIVEN POWER STEERING SYSTEM FOR A VEHICLE

[75] Inventors: Mitsuharu Morishita; Shinichi Kohge, both of Himeji, Japan

[73] Assignee: Mitsubishi Denki Kabushiki Kaisha, Japan

[21] Appl. No.: 59,043

[22] Filed: Jun. 8, 1987

[30] Foreign Application Priority Data

Jun. 12, 1986 [JP] Japan .................. 61-139023

[51] Int. Cl.⁴ ............................ B62D 5/04
[52] U.S. Cl. .................. 180/79.1; 192/0.02 R; 192/84 R
[58] Field of Search ........... 180/79.1, 142, 6.24, 180/6.44; 192/84 R, 84 E, 0.02 R

[56] References Cited

U.S. PATENT DOCUMENTS

| 4,639,651 | 1/1987 | Shimizu | 180/79.1 X |
| 4,687,976 | 8/1987 | Shimizu | 180/6.28 X |

FOREIGN PATENT DOCUMENTS

| 115557 | 7/1942 | Australia | 192/0.02 R |
| 5038229 | 4/1975 | Japan . | |
| 160359 | 7/1986 | Japan | 180/79.1 |
| 196863 | 9/1986 | Japan | 180/79.1 |
| 2171657 | 9/1986 | United Kingdom | 180/79.1 |

Primary Examiner—John J. Love
Assistant Examiner—Mitchell J. Hill
Attorney, Agent, or Firm—Leydig, Voit & Mayer

[57] ABSTRACT

A motor-driven power steering system for a vehicle capable of preventing or substantially reducing generation of shocks and noises when the steering system is changed from a power steering mode into a manual steering mode or vice versa. A motor is operatively connected with steerable road wheels and adapted to be energized by a power source to transmit a force to the steerable road wheels for power assisting steering motion caused by the operator through a steering wheel. An electromagnetic hysteresis clutch is interposed between the motor and the steerable road wheels for electromagnetically connecting the motor with the steerable road wheels in such a manner that the power-assisting force transmitted from the motor to the steerable road wheels is continuously changed in accordance with an exciting current supplied to the clutch. A control unit receives output signals representing operator-induced steering torque and vehicle speed for controlling the respective running and switching operations of the motor and the electromagnetic hysteresis clutch in accordance therewith.

10 Claims, 6 Drawing Sheets

MOTOR-DRIVEN POWER STEERING SYSTEM FOR A VEHICLE

FIELD OF THE INVENTION

The present invention relates to a motor-driven power steering system for a vehicle which is adapted to power assist the operator-induced steering operation by means of rotating force of a motor.

DESCRIPTION OF THE PRIOR ART

In the past, a motor-driven power steering system for a vehicle has hitherto been known in which a motor is operatively connected through a sliding clutch and a speed reduction gear with a steering rack which is connected with a steering wheel and the steerable road wheels of the vehicle for power assisting the steering efforts imparted to the steering wheel by the operator. In this type of the motor-driven power steering system, the sliding clutch serves to control the transmission of the output torque of the motor to the steering rack so that the torque transmitted from the motor to the steering rack is continuously increased or decreased. To this end, as such a sliding clutch, there is generally employed a powder clutch which has a relatively large torque-transmission capacity per unit weight. With the powder clutch, however, there is the fear that a locking phenomenon due to powder clogging may arise in which powder is clogged between an input member and an output member of the powder clutch. In order to cope with such a situation, an electromagnetic switching clutch is usually provided at a location between the motor and the speed reduction gear or between the speed reduction gear and the steering rack for failsafe purposes alone. Namely, the electromagnetic switching clutch is normally switched on to permit transmission of a power assisting force from the motor to the steering rack but switched off to interrupt the force transmission if such a locking phenomenon of the powder clutch takes place.

In another type of conventional motor-driven power steering system, a motor is connected through a speed reduction gear with a steering rack without employing any sliding clutch so that the output torque of the motor is transmitted to a steering rack through the speed reduction gear. In this case, the motor torque is directly controlled to increase or decrease in accordance with the intensity of steering torque exerted on to a steering wheel by an operator. With this type of the motor-driven power steering system, however, if the motor has failed for some reason, it becomes a load against the steering motion of the operator and it is therefore necessary to provide an electromagnetic switching clutch at a location between the motor and the speed reduction gear or the steering rack and the speed reduction gear so as to disconnect the motor from the steering rack upon failure in the motor. Further, the motor torque is generally controlled to decrease in accordance with an increase in the travelling speed of the vehicle, and the electromagnetic switching clutch is switched off for interrupting the transmission of the power assisting force when the vehicle speed increases to exceed a prescribed level at which there is no need for power assistance any longer. The electromagnetic switching clutch has an input member connected with the motor and an output member connected with the steering rack so that the input and output members are mechanically connected and disconnected under the action of magnetic force. In this type of power steering system, however, when the electromagnetic switching clutch is suddenly switched on and off, there will be shocks transmitted to the steering wheel. To avoid this, it is considered to control the electromagnetic switching clutch in such a manner that the current supplied to the electromagnetic switching clutch is gradually increased and decreased upon switching on and off of the clutch. In this case, there arises another problem that sliding noises due to the sliding contact between the input and output members will develop during the increasing or decreasing period of the clutch current.

SUMMARY OF THE INVENTION

In view of the above, the present invention has the objective of eliminating the above-described various problems of the prior art, and has for its main object the provision of a motor-driven power steering system for a vehicle which requires no electromagnetic switching clutch which is conventionally used for failsafe purposes, thereby reducing the number of component parts and hence the cost of production, and which is able to prevent or substantially reduce generation of shocks and noises when the steering system is changed from a power steering mode into a manual stering mode or vice versa.

In order to achieve the above object, according to the present invention, there is provided a motor-driven power steering system for a vehicle having a steering wheel operatively connected to steer steerable road wheels in response to force exerted thereon by an operator, the motor-driven steering system comprising:

a torque sensor connected to detect operator-induced steering torque resulting from steering force imparted exerted on to the steering wheel by the operator and generating an output signal representative thereof;

a vehicle speed sensor for detecting the vehicle speed to generate an output signal representative of the detected vehicle speed;

a motor operatively connected with the steerable road wheels and adapted to be energized by a power source to transmit a force to the steerable road wheels for power assisting steering motion caused by the operator through the steering wheel;

an electromagnetic hysteresis clutch interposed between the motor and the steerable road wheels for electromagnetically establishing and interrupting the transmission of the power-assisting force from the motor to the steerable road wheels such a manner such that an assisting torque transmitted from the motor to the steerable road wheels is continuously changed in accordance with the exciting current supplied to the clutch; and a control unit connected to receive the output signals from the torque sensor and the vehicle speed sensor for controlling respective running and switching operations of the motor and the electromagnetic hysteresis clutch in such a manner that the current supplied to the motor and the current supplied to the clutch are respectively controlled in accordance with the detected steering torque and the detected vehicle speed.

In one embodiment, the control unit controls the electromagnetic hysteresis clutch in such a manner that the exciting current supplied to the electromagnetic hysteresis clutch is gradually decreased in accordance with an increase in the vehicle speed when the vehicle speed rises above a prescribed first level, and gradually increased in accordance with a decrease in the vehicle speed when the vehicle speed falls below a prescribed second level which is greater than the first level.

In another embodiment, the control unit controls the electromagnetic hysteresis clutch in such a manner that the exciting clutch current is gradually supplied and interrupted at arbitrary vehicle speeds. Specifically, the control unit controls the electromagnetic hysteresis clutch such that the exciting current supplied to the electromagnetic hysteresis clutch is gradually decreased to zero at a first prescribed speed of the vehicle, and gradually increased from zero at a second prescribed speed of the vehicle.

Preferably, the electromagnetic hysteresis clutch comprises:

a stator having an exciting coil;

a hollow input shaft having a first rotor fixedly mounted thereon for integral rotation therewith, the first rotor having a plurality of outer magnetic poles and a plurality of inner magnetic poles disposed radially inwardly of the outer magnetic poles so as to define an annular clearance therebetween, the outer and inner magnetic poles being disposed in the vicinity of the exciting coil;

an output shaft extending through the hollow input shaft so as to rotatably support the input shaft; and a second rotor fixedly mounted on the output shaft for integral rotation therewith and having an annular magnetic member secured thereto which is disposed in the annular clearance between the outer and inner magnetic poles.

The input shaft is operatively connected with the motor or the steerable road wheels, and the output shaft is operatively connected with the steerable road wheels or the motor.

Preferably, the outer magnetic poles are disposed on a first circle at substantially equal circumferential intervals, and the inner magnetic poles are disposed on a second circle, which is concentric with and radially inward of the first circle, at substantially equal circumferential intervals.

Preferably, the magnetic member extends radially outward from the second rotor to be bent axially into the annular clearance.

The above and other objects, features and advantages of the present invention will become apparent from the following detailed description of a presently preferred embodiment of the invention when read in conjunction with the accompanying drawings.

DESCRIPTION OF THE PREFERRED EMBODIMENT

The present invention will now be described in detail with reference to a presently preferred embodiment thereof as illustrated in the accompanying drawings.

Figure 1:
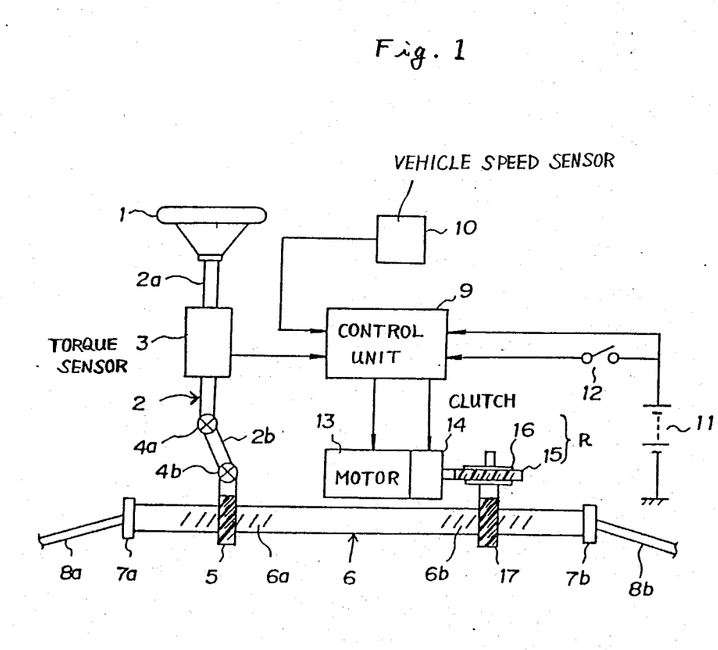
FIG. 1 is a schematic view showing the general arrangement of a motor-driven power steering system in accordance with one embodiment of the present invention.

In FIG. 1, there is shown the general arrangement of a motor-driven power steering system constructed in accordance with the present invention. The motor-driven steering system as illustrated includes a steering wheel 1; a steering shaft 2 fixedly connected at its upper end with the steering wheel 1 for integral rotation therewith; a torque sensor 3 mounted on the steering shaft 2 for detecting operator-induced steering torque resulting from steering force exerted on the steering wheel 1 by an operator to generate an electrical signal representative of the detected steering torque, the steering shaft 2 including an upper section 2a and a lower section 2b joined with each other through a first universal joint 4a; a first pinion 5 operatively connected at its upper end with the the lower end of the steering shaft 2 through a second universal joint 4b; a rack 6 operatively connected at its opposite ends through ball joints 7a, 7b with tie rods 8a, 8b which are in turn connected with a pair of steerable road wheels (not shown), the rack 6 having a first tooth portion 6a in mesh with the first pinion 5 and a second tooth portion 6b axially spaced from or otherwise continuous with the first tooth portion 6a; a vehicle speed sensor 10 for detecting the travelling speed of a vehicle to generate an output signal representative of the detected vehicle speed; a power source 11 in the form of a battery adapted to be mounted on the vehicle; a key or ignition switch 12; a second pinion 17 in meshing engagement with the second rack tooth portion 6b on the rack 6; a motor 13 operatively connected through a speed-reduction gear R with the second pinion 17 for power assisting the steering motion of the rack 6 induced by the operator, the motor being preferably in the form of a direct current motor having a shunt winding field or a magnetic field and adapted to be driven to rotate by the battery 11; an electromagnetic hysteresis clutch 14 interposed between the motor 13 and the second pinion 17 for transmitting power therebetween substantially in proportion to the current supplied thereto, the clutch 14 being directly coupled, in the illustrated embodiment, with an output shaft of the motor 13; and a control unit 9 adapted to receive output signals from the torque sensor 3 and the vehicle speed sensor 10 for controlling respective running and switching operations of the motor 13 and the electromagnetic hysteresis clutch 14. In the illustrated embodiment, the speed-reduction gear R comprises a worm 15 operatively connected with the electromagnetic hysteresis clutch 14, and a worm wheel 16 which is in mesh with the worm 15 and which is operatively connected with the second pinion 17.

Figure 2:
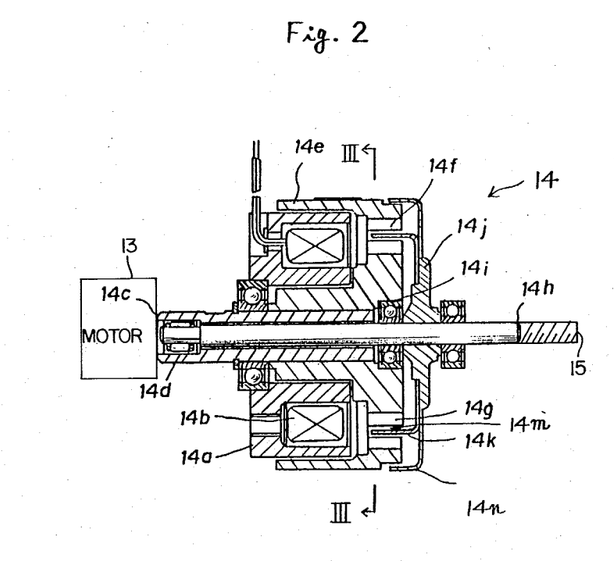
FIGS. 2 and 2A are vertical cross sectional views of an electromagnetic hysteresis clutch as illustrated in FIG. 1.
Figure 3:
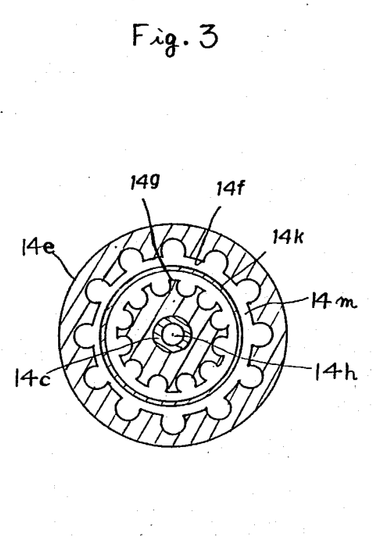
FIG. 3 is a cross sectional view of the electromagnetic hysteresis clutch taken along line III—III of FIG. 2.

As illustrated in FIGS. 2 and 3, the electromagnetic hysteresis clutch 14 comprises: a stator 14a having an exciting coil 14b; a hollow cylindrical input shaft 14c connected with the rotary shaft of the motor 13 and having a first rotor 14e fixedly mounted thereon for integral rotation therewith, the first rotor 14e having a plurality of outer magnetic poles 14f disposed on a first circle at equal circumferential intervals and a plurality of inner magnetic poles 14g disposed at equal circumferential intervals on a second circle which is concentric with and radially inwardly of the first circle; an output shaft 14h connected with the worm 15 of the speed reduction gear R and extending through the hollow input shaft 14c, the output shaft 14h rotatably supporting the input shaft 14c at the opposite ends thereof through a needle bearing 14d and a ball bearing 14i, respectively; and a second rotor 14j fixedly mounted on the output shaft 14h for integral rotation therewith at a location adjacent one end of the first rotor 14e, the second rotor 14j having an annular plate-like magnetic member 14k secured at its base portion to the second rotor 14j, the magnetic member 14k extending radially outward from the second rotor 14j and being bent axially at its distal portion into an annular clearance or space 14m defined between the outer and inner poles 14f, 14g of the first rotor 14e, the second rotor 14j further having a cover 14n which extends radially outward from the second rotor 14j so as to cover one end surface of the first rotor 14e.

Figure 6:
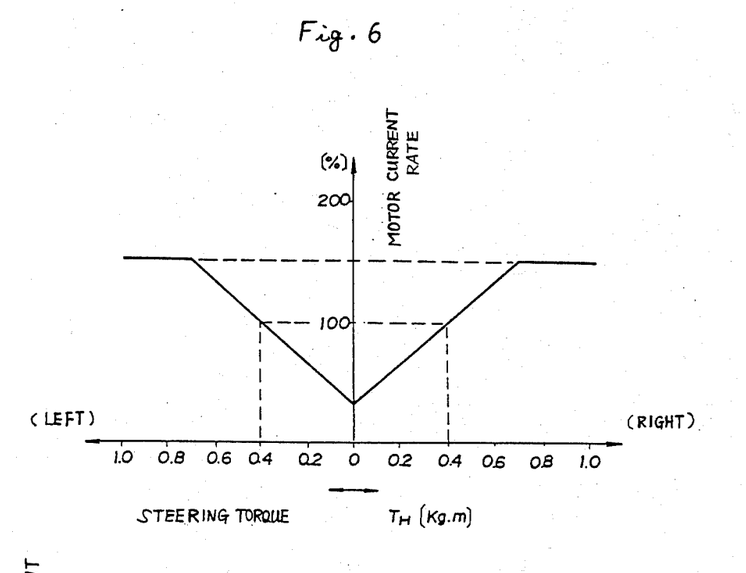
FIG. 6 is a characteristic view of the motor showing the relationship between the motor current rate and the steering torque.

Now, the operation of the motor-driven power steering system as constructed above will be described in detail. First, the case in which a vehicle is stationary or travelling at a low speed (i.e, less than 10 Km/h) is considered. In FIG. 1, when the key or ignition switch 12 is turned on to start the engine, the control unit 12 is supplied with electric power from the power source 11 via the key switch 12 and begins to operate. If the entire electric circuit is normal or free from failure, the hysteresis clutch 14 is supplied with 100% exciting current under the control of the control unit 9 so that the rotary shaft of the motor 13 is connected with the worm 15 so as to fully transmit the assisting force from the motor 13 and the worm 15. In this state, if the steering wheel 1 is turned by the operator, the control unit 9 acts to control the current supplied to the motor 13 in the manner as illustrated in the control characteristic view of FIG. 6. Specifically, if the steering torque is increased to the right, the motor current increases substantially in direct to the intensity of the steering torque. At this time, even if the steering torque is zero, a certain level of current corresponding to the motor current under no load (for example, 20-30% of the full load current) is supplied to the motor 13 so as to alleviate a sense of drag which would be otherwise caused at a rising time of the motor current. Similarly, when the steering torque is increased to the left, the motor current is controlled in the same manner as described above. In this manner, the motor 13 is supplied a current corresponding to the steering torque to produce rotating force or torque which is transmitted through the hysteresis clutch 14 to the worm 15 and thence to the steering rack 6 via the worm wheel 16, the second pinion 17 and the second rack tooth portion 6b. In this case, the hysteresis clutch 14 does not slip at all between the first and second rotors 14e, 14j and transmits the torque from the motor 13 to the worm 15 at a transmission rate of 100%. The torque thus transmitted from the motor 13 to the steering rack 6 acts in the same direction as the steering torque exerted on the steering wheel 1 by the operator so as to power assist the operator's steering efforts, thus lightening the steering operation for the operator.

Figure 7:
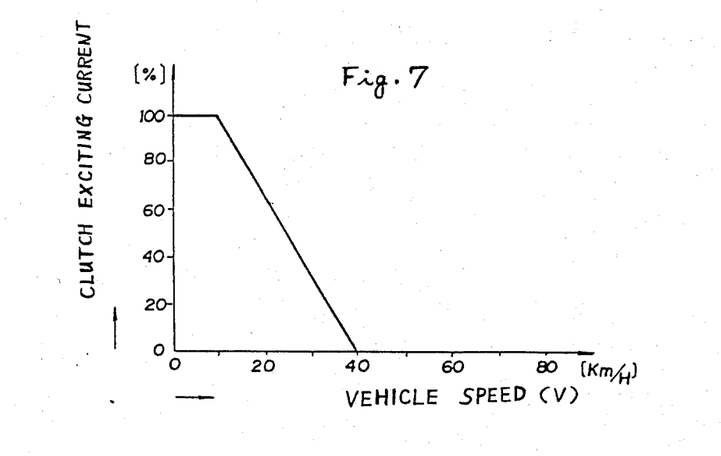
FIG. 7 is a control characteristic view of the electromagnetic hysteresis clutch showing the relationship between the exciting current of the clutch and the vehicle speed.

As previously referred to, the above operation of the power steering system is performed when the vehicle is standing still or travelling at a low speed, and in this state, the hysteresis clutch 14 is supplied with 100% exciting current as clearly shown in FIG. 7 so that the output torque of the motor 13 is transmitted to the worm 15 through the hysteresis clutch 14 without any reduction and there is no slippage developed in the hysteresis clutch 14.

Figure 4:
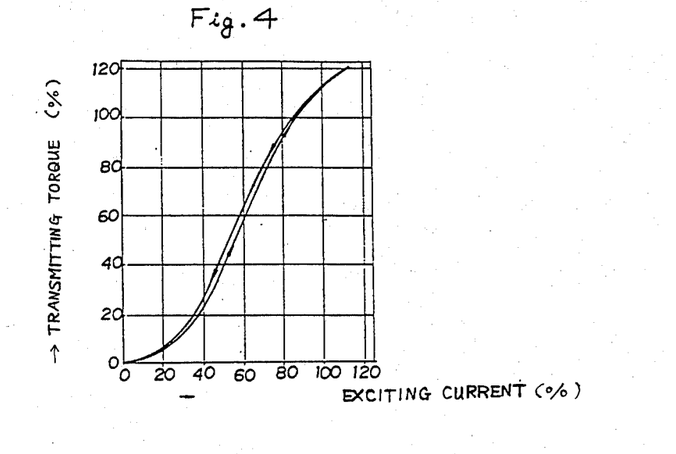
FIG. 4 is a characteristic view of the electromagnetic hysteresis clutch showing the relationship between the steering torque and the clutch current.
Figure 5:
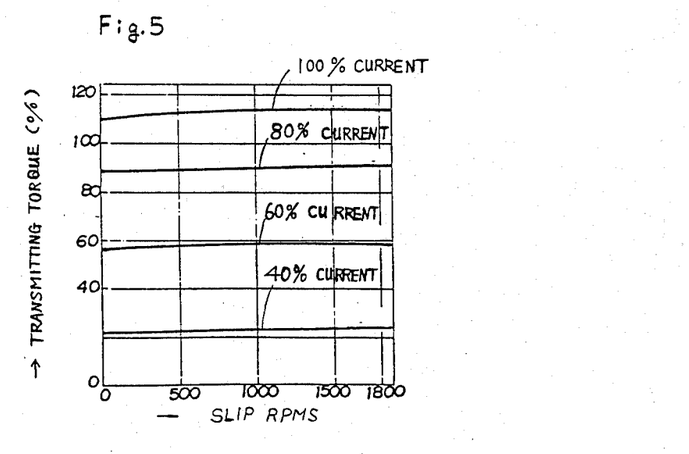
FIG. 5 is another characteristic view of the electromagnetic hysteresis clutch showing the relationship between the steering torque and the slip rpms of the motor with respect to the motor current.

Here, the operational principles and the operational characteristic of the hysteresis clutch 14 will be described with reference to FIGS. 2 through 5. First, as shown in FIG. 2, the exciting coil 14b of the stator 14a is supplied with exciting current from the power source 11 through the control unit 9 to produce rotating magnetic field in the clearance 14m defined between the outer and inner magnetic poles 14f and 14g of the first rotor 14e. Due to this rotating magnetic field, the magnetic member 14k of the second rotor 14j disposed in the clearance 14m is magnetized. In this case, the magnetic member 14k has hysteresis which delays the change in polarity of the magnetic member 14k with respect to the change in polarity of the outer and inner magnetic poles 14f and 14g of the first rotor 14e, as a consequence of which the first rotor 14e is magnetically connected with the second rotor 14j by virtue of magnetic interaction between the outer and inner magnetic poles 14f and 14g and the magnetic member 14k. Such a hysteresis characteristic of the clutch 14 is clearly illustrated in FIGS. 4 and 5. More particularly, FIG. 4 shows the relationship between the exciting current and the steering torque. According to the present invention, that portion of the characteristic relationship or the hysteresis curve which has good linearity is used so that the torque to be transmitted through the clutch 14 is in direct proportion to the saturation characteristic of the magnetic circuit (i.e., the current supplied to the clutch 14). FIG. 5 is a characteristic view showing the relationship between the slip rpms of the motor 13 and the steering torque in which the change in the transmitting torque with respect to the slip rpms is shown taking the exciting current as a parameter. From FIG. 5, it is clear that the change in the slip rpms has no substantial influence on the transmitting torque.

Now, the case in which the vehicle is travelling at a speed higher than 10 Km/h is considered. In this case, the control unit 9 controls the operation of the hysteresis clutch 14 in the manner as illustrated in FIG. 7. The exciting current supplied to the hysteresis clutch 14 begins to gradually decrease from a vehicle speed of about 10 Km/h in accordance with an increase in the travelling speed of the vehicle and is made zero at a speed of 40 Km/h so that at a speed greater than 40 Km/h in which there is no need of power assist, the vehicle travels with a non-power assisted manual steering mode. On the other hand, when the vehicle speed decreases, the exciting current begins to gradually increase from the vehicle speed of 40 Km/h and is made 100% at 20 Km/h. In this connection, the power-assisting force is gradually decreased or increased as the vehicle speed increases or decreases, respectively, so that there will be no abrupt change in the steering mode, thereby preventing generation of shocks upon transfer of the steering system from power steering into manual steering or vice versa. During such a gradual change in the clutch current, no noise will be developed in the hysteresis clutch 14 because there is no sliding contact between the first and second rotors 14e and 14j.

Figure 8:
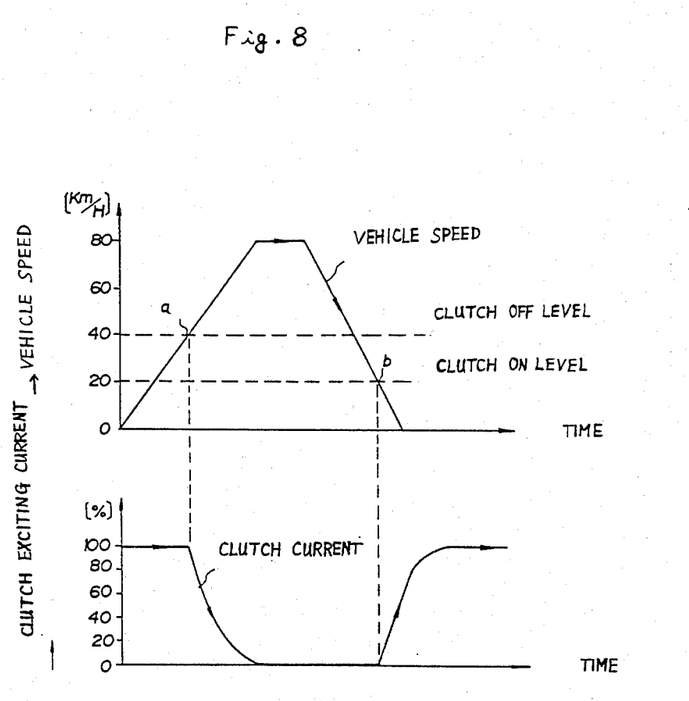
FIG. 8 is another control characteristic view showing the relationship between the exciting current of the clutch, the vehicle speed and the switching-on and switching-off levels of the clutch with respect to time.

FIG. 8 illustrates another control process in accordance with the present invention in which the steering system is changed from a power steering mode into a manual steering mode or vise versa at arbitrary speeds of the vehicle. Specifically, when the vehicle speed increases to reach a first prescribed level (for example, 40 Km/h) at point a at which the hysteresis clutch 14 is to be switched off, the control unit 9 issues an OFF signal to the hysteresis clutch 14 whereby the current supplied to the hysteresis clutch 14 is not abruptly interrupted but instead begins to be gradually decreased from 100% toward 0% in a prescribed time period (for example, 100–1000 ms). Also, when the vehicle speed decreases below a second prescribed level (for example 20 Km/h) at point b at which the hysteresis clutch 14 is to be switched on, the clutch current begins to be gradually increased from 0% toward 100% in a prescribed time period. In this manner, any shocks and noises resulting from abrupt changes in the power assisting torque can be effectively prevented, thus avoiding any unusual or instable feeling on the part of the operator.

Although in the above-described embodiment, the first pinion 5 and the second pinion 17 are employed, the second pinion 17 may be integrally connected with the first pinion 5 to provide a single pinion shaft. In this case, there will be obtained the same results as described above.

Figure 2A:
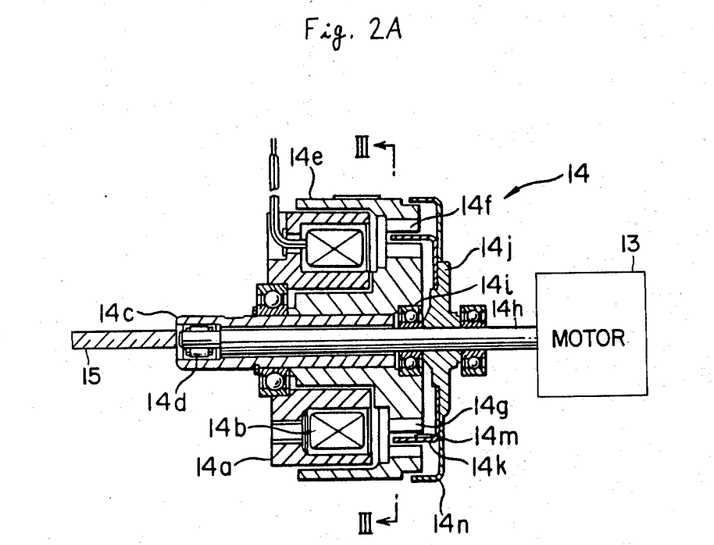

Further, in the above-described embodiment, the input shaft 14c and the output shaft 14h of the electromagnetic hysteresis clutch 14 are connected with the motor 13 and the worm 15 of the speed reduction gear R, respectively, as shown in FIG. 2A but instead, such connections may be reversed as shown in FIG. 2.

What is claimed is:

1. A motor-driven power steering system for a vehicle having a steering wheel operatively connected to steer steerable road wheels in response to force exerted thereon by an operator, said motor-driven power steering system comprising:
   a torque sensor connected to detect operator-induced steering torque resulting from steering force exerted on a steering wheel by an operator and generating an output signal representative thereof;
   a vehicle-speed sensor detecting vehicle speed to generate an output signal representative of the detected vehicle speed;
   a motor operatively connected with steerable road wheels and adapted to be energized by a power source to transmit a torque to the steerable road wheels for power-assisting steering motion caused by the operator through the steering wheel;
   an electromagnetic hysteresis clutch interposed between said motor and the steerable road wheels, said clutch having drive and driven rotors free of mechanical contact and electromagnetically coupled to each other to operatively connect said motor with the steerable road wheels in such a manner that the power-assisting torque transmitted from said motor to the steerable road wheels is continuously and gradually changed in direct proportion to an exciting current supplied to said clutch; and
   a control unit connected to receive output signals from said torque sensor and said vehicle-speed sensor, said control unit including means for controlling respective running and coupling operations of said motor and said electromagnetic hysteresis clutch in such a manner that a current supplied to said motor is controlled in accordance with the detected steering torque and the detected vehicle speed whereas the exciting current supplied to said clutch is at a maximum when the detected vehicle speed is under a prescribed first level and is gradually decreased to zero after the detected vehicle speed increases to the predetermined level whereby said hysteresis clutch develops no slippage when the detected vehicle speed is under the prescribed first level, providing a manual steering mode, and develops a gradual change in the power-assisting torque after the detected vehicle speed exceeds the first level, providing a power-assisted steering mode and a transition between manual and power-assisted steering modes without generation of shock.

2. A motor-driven power steering system for a vehicle according to claim 1 wherein said control unit controls the coupling operation of said electromagnetic hysteresis clutch in such a manner that the exciting current supplied to said electromagnetic hysteresis clutch is gradually decreased in accordance with an increase in vehicle speed when the vehicle speed rises above a prescribed first level and gradually increased in accordance with a decrease in the vehicle speed when the vehicle speed falls below a prescribed second level which is greater than said first level.

3. A motor-driven power steering system for a vehicle according to claim 1 wherein said control unit controls the electromagnetic hysteresis clutch in such a manner that the exciting current is gradually supplied and interrupted at arbitrary vehicle speeds.

4. A motor-driven power steering system for a vehicle according to claim 3 wherein said control unit controls the electromagnetic hysteresis clutch such that the exciting current supplied to said electromagnetic hysteresis clutch at a first prescribed vehicle speed is gradually decreased to zero and gradually increased from zero at a second prescribed vehicle speed.

5. A motor-driven power steering system for a vehicle according to claim 1 further comprising a speed reduction gear interposed between said electromagnetic hysteresis clutch and said steerable road wheels.

6. A motor-driven power steering system for a vehicle according to claim 1 wherein said electromagnetic hysteresis clutch comprises:
   a stator having an exciting coil;
   a hollow input shaft having a first rotor fixedly mounted thereon for integral rotation therewith, said first rotor having a plurality of outer magnetic poles and a plurality of inner magnetic poles disposed radially inwardly of said outer magnetic poles so as to define an annular clearance therebetween, said outer and inner magnetic poles being disposed in the vicinity of said exciting coil;
   an output shaft extending through said hollow input shaft so as to rotatably support said input shaft; and
   a second rotor fixedly mounted on said output shaft for integral rotation therewith and having an annular magnetic member secured thereto which is disposed in said annular clearance between said outer and inner magnetic poles.

7. A motor-driven power steering system for a vehicle according to claim 6 wherein said input shaft is operatively connected with said motor and said output shaft is operatively connected with said steerable road wheels.

8. A motor-driven power steering system for a vehicle according to claim 6 wherein said input shaft is operatively connected with said steerable road wheels and said output shaft is operatively connected with said motor.

9. A motor-driven power steering system for a vehicle according to claim 6 wherein said outer magnetic poles are disposed on a first circle at substantially equal circumferential intervals and said inner magnetic poles are disposed on a second circle, which is concentric with and radially inward of said first circle, at substantially equal circumferential intervals.

10. A motor-driven power steering system for a vehicle according to claim 6 wherein said magnetic member extends radially outward from said second rotor and is bent axially into said annular clearance.

* * * * *